(12) United States Patent
Koike

(10) Patent No.: US 6,335,835 B1
(45) Date of Patent: Jan. 1, 2002

(54) TAKING LENS FOR FIXED-FOCUS PHOTOGRAPHIC CAMERA

(75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/497,403

(22) Filed: Feb. 3, 2000

(30) Foreign Application Priority Data

Feb. 5, 1999 (JP) ............................................ 11-028155

(51) Int. Cl.$^7$ ............................ G02B 13/18; G02B 9/08
(52) U.S. Cl. ...................................... 359/717; 359/794
(58) Field of Search ............................... 359/793, 794, 359/717

(56) References Cited

U.S. PATENT DOCUMENTS 5,689,376 A * 11/1997 Lewis ........................ 359/717

* cited by examiner

Primary Examiner—Scott J. Sugarman
(74) Attorney, Agent, or Firm—Young & Thompson

(57) ABSTRACT

A taking lens comprises, in order from the object side, a first lens group which consists of a positive power first meniscus lens element convex to the object side and a second lens group which consists of a positive power second meniscus lens element concave to the object side. The first lens element at an image side surface and the second lens element at either one of image and object side surfaces are configured aspheric and the taking lens satisfies the following conditions:

$$|f1| > f2$$

$$R1 > R2$$

where f1 is the focal length of the first lens element, f2 is the focal length of the second lens element, and R1 and R2 are the radii of curvature of the object side and image side surfaces of the first lens element.

10 Claims, 13 Drawing Sheets

70 % RELATIVE FIELD HEIGHT (25.70°)

70 % RELATIVE FIELD HEIGHT (25.72°)

70 % RELATIVE FIELD HEIGHT (25.75°)

70 % RELATIVE FIELD HEIGHT (25.52°)

70 % RELATIVE FIELD HEIGHT (25.53°)

70 % RELATIVE FIELD HEIGHT (25.59°)

TAKING LENS FOR FIXED-FOCUS PHOTOGRAPHIC CAMERA

BACKGROUND OF THE INVENTION

1. Field of the Invention

The present invention relates to a taking lens comprising two lens groups each of which consists of a single lens element suitable for fixed-focus camera such as a low price camera and a single-use lens-fitted film unit.

2. Description of the Prior Art

A variety of photographic cameras that meet various uses and functions have been on the market. In recent years, there are lens-fitted film units on the market. Such a lens-fitted film unit provides persons with enjoyment from easily taking photographs. The lens-fitted film unit, which comprises a light-tight film casing with an exposure mechanism including a taking lens and a shutter incorporated therein and a roll of film factory loaded therein, is widely used because of such convenience that taking pictures is possible right after purchase of it and it is only given as it is to a photofinisher for development and printing when the maximum number of exposures available on the film are partly or completely exposed.

Because the lens-fitted film unit has the feature to offer low prices and is demanded to be produced at low costs, it is made as simple in structure as possibly. For example, the taking lens is installed to a lens holder with a fixed diameter of aperture and has a fixed focus suitable for standard photography in quite many opportunities. A lens-fitted film unit factory loaded with a roll of conventional 35 mm film is provided with a semi-field angle ($\omega$) of approximately 34°, a taking lens with a focal length of approximately 32 mm and an F-number of approximately 9.5. A lens-fitted film unit factory loaded with a roll of conventional 24 mm film is provided with a semi-field angle ($\omega$) of approximately 35°, a taking lens with a focal length of approximately 24 mm and an F number of approximately 9.5.

Taking lenses for these lens-fitted film units and low-priced cameras typically comprise one or two lens elements, and, the recent general tendency for such a taking lens is to consist of two lens groups and a single element for each lens group in light of great advantage to corrections of various aberrations. Many two lens group-two lens element taking lenses comprise two meniscus lens elements arranges with their concave surfaces facing each other or comprise a positive power meniscus lens element and a bi-convex lens element arranged in order from the object side to the image side. In consideration of shaping performance and optical characteristics of taking lenses, it is advantageous to form a lens element spherical rather than aspheric. However, if providing a taking lens comprising two meniscus lens elements each of which consists of aspheric surfaces, the taking lens not only produces aggravation of spherical aberrations which is too serious for correction but also is limited to an F number of approximately 11 which significantly lowers brightness on an image plane.

Therefore, when utilizing a taking lens of this kind, it is typical to form the object side surface of a lens element arranged on the object side aspheric or to form both object side surface of a lens element arranged on the object side and image side surface of a lens element arranged on the image side aspheric. This taking lens is appropriately corrected in spherical aberration and improved in F number up to approximately 9. For example, as disclosed in Japanese Unexamined Patent Publication No. 1-307712, forming both object side surface of the lens element arranged on the object side and image side surface of the lens element arranged on the image side aspheric provides desirably balanced distribution of various aberrations. On the other hand, a taking lens including a positive power bi-convex lens element arranged on the object side is easily corrected in spherical aberration and, however, provides aggravation of field curvature which leads to significant aggravation of image sharpness at the periphery of an image. Accordingly, likely the taking lens disclosed in the above publication, the lens element arranged on the object side is provided with an aspheric surface at the object side so as to control aggravation of field curvature. Because forming the object side surface of the lens element arranged on the object side aspheric produces aggravation of field curvature in a sagittal plane too serious for correction, a camera with the conventional taking lens described above makes up for the aggravation of field curvature of the taking lens by making the image plane concave to the object side in a lengthwise direction in which a film is advanced.

Because the concave image plane causes distortion of an image on the image plane, it is necessary to leave the taking lens distortion with the intention of cancelling the distortion due to the curvature of the image plane, as a result of which than taking lens produces aggravation of chromatic difference of magnification to an extent difficult to correct. Furthermore, the taking lens is limited in semi-field angle ($\omega$) to approximately 30°, which makes it undesirable to incorporate the taking lens into fixed-focus cameras such as the lens-fitted film unit described above.

SUMMARY OF THE INVENTION

It is, therefore, an object of the present invention to provide a two lens group-two lens element taking lens which provides high brightness on an image plane and well balanced distribution of various aberrations without reducing a field angle.

It is another object of the present invention to provide a taking lens suitable for fixed-focus photographic devices such as lens-fitted film unit and low price conventional cameras which have an image plane less curved to make up for aggravation of field curvature of the taking lens.

The foregoing objects of the present invention are accomplished by a two lens group-two lens element taking lens comprising, in order from the object side, a first lens group which consists of a positive power first meniscus lens element convex to the object side, a fixed aperture and a second lens group which consists of a positive power second meniscus lens element concave to the object side. The positive power first meniscus lens element at an image side surface and the positive power second meniscus lens element at one of image and object the surfaces are defined by the following relationship:

$$Z=Ch^2/[1+\sqrt{1-(1+K)C^2h^2}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants. Further, the positive power first and second meniscus lens elements are designed and configured so as to satisfy the following conditions:

$$|f1|>f2$$

$$R1>R2$$

where f1 is the focal length of the positive power first meniscus lens element, f2 is the focal length of the positive power second meniscus lens element, R1 is the radius of curvature of the object side surface of the positive power first meniscus lens element, and R2 is the image side surface of the radius of curvature of the positive power first meniscus lens element.

Satisfaction of the conditions realizes high brightness on an image plane and well prevents aggravation of various aberrations such as spherical aberration and field curvature without reducing the field angle. Configuring the positive power first meniscus lens element with non-aspheric surface at the object side restrains aggravation of field curvature in the sagittal plane. In consequence, it is possible to alleviate field curvature of the taking lens with an effect of alleviation of chromatic difference of magnification due to curvature of the image plane even when the image plane is less curved.

The taking lens is favorably incorporated in a fixed-focus photographic device provided with an image plane which is bent concave in a direction of film movement to the object side and on which the taking lens forms an image of an object, such as a lens-fitted film unit and a low-price conventional camera.

The positive power first and second meniscus lens elements are preferably made of plastics with an effect of improvement of productivity.

BRIEF DESCRIPTION OF THE DRAWINGS

The foregoing and other objects and features of the invention will be understood more clearly from the following description when read in conjunction with the accompanying drawings, in which the same reference numerals have been used to denote same or similar parts or mechanisms throughout the drawings and wherein.

DETAILED DESCRIPTION OF THE INVENTION

Figure 1:
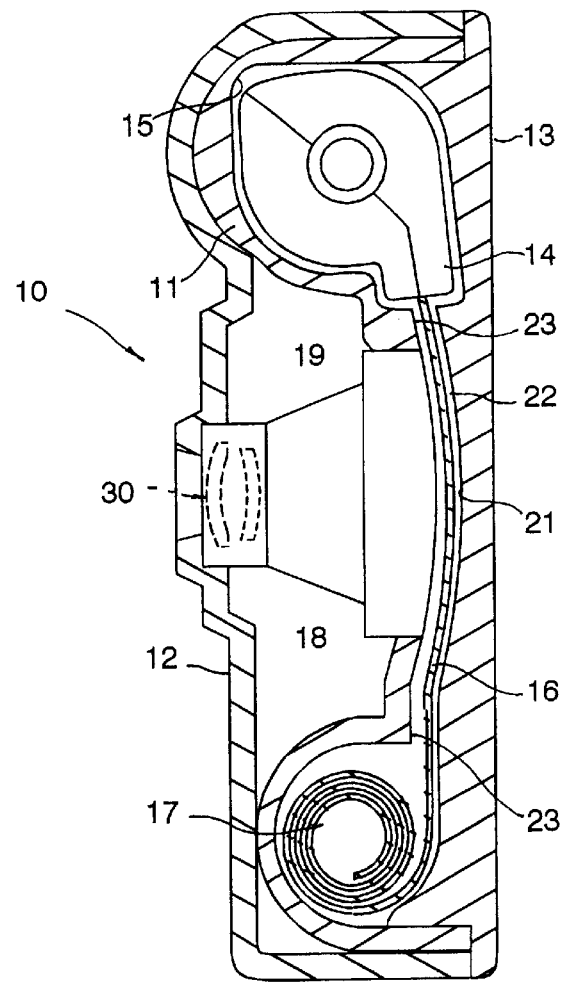
FIG. 1 is a schematic sectional view of a lens-fitted film unit equipped with a taking lens of the present invention.

Referring to the drawings in detail, and in particular to FIG. 1 showing a lens-fitted film unit 10 equipped with a taking lens 30 in accordance with a preferred embodiment of the invention, the lens-fitted film unit 10 includes a light-tight film casing which comprises a main casing 11 and front and back covers 12 and 13 attached to the main casing 11 so as to form a light-tight chamber in the main casing 11. The main casing 11 at its opposite ends in the lengthwise direction is provided with a film cartridge receiving chamber 15 in which a film cartridge 14 is received, a roll film supporting chamber 17 into which a filmstrip 16 unwound out of the film cartridge 14 is wound in a roll and an exposure aperture 18 which defines an exposure area on a filmstrip 16 between the film cartridge receiving chamber 15 and the roll film supporting chamber 14. The lens-fitted film unit is equipped with an exposure unit 19 which comprises a fixed-focus taking lens 30, a finder optical system, a film metering mechanism, a shutter mechanism and associated parts and is positioned in front of the exposure aperture and firmly held between the front and back covers 12 and 13. The back cover 13 is formed with a film support surface 21 facing the exposure aperture 18 so as to form a film path 22 between the film support surface 21 and top and bottom film tracks 23 of the main casing 11 along the full length between the film cartridge receiving chamber 15 and the roll film supporting chamber 14. The film support surface 21 of the back cover 13 and the film tracks 23 of the main casing 11 are curved in the lengthwise direction in which the filmstrip 16 moves so as to form a film path concave to the object side. The filmstrip 16 in the film path 22 is bent concave with a radius of, for example in this embodiment, approximately 110 mm. After every exposure of one frame, the filmstrip 16 is unwound from the film cartridge 14 in the film cartridge receiving chamber 15 by one frame and then, while the exposed frame of the filmstrip 16 is rolled into the roll film supporting chamber 17 every exposure, a succeeding unexposed frame of the filmstrip 16 is positioned in the exposure aperture 18. In this instance, the filmstrip 16 has a width of 24 mm and a exposure frame format of 16.7×30.2 mm which is defined by the exposure aperture 18.

Figure 2:
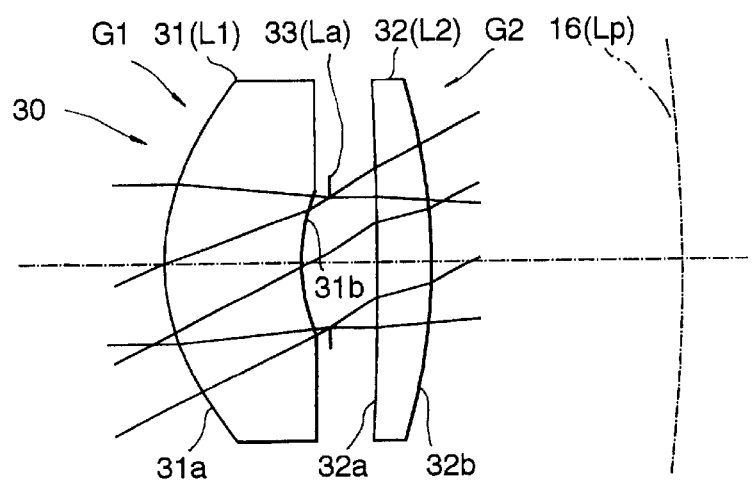
FIG. 2 is a side elevation of a general lens form embodying the present invention.

Referring to FIG. 2, a taking lens 30 embodying the present invention comprises first and second lens groups G1 and G2 arranged in order from the object side, and an fixed aperture 33 (La) disposed between the first and second lens groups G1 and G2. Each lens group G1, G2 in the simplest form comprises a positive power single meniscus lens element 31 (L1), 32 (L3). The positive power meniscus lens element (which is hereafter referred to as the first lens element) 31 (L1) of the first lens group G1 is convex to the object side and formed with a convex object side surface 31a and an aspheric image side surface 31b. The positive power meniscus lens element (which is hereafter referred to as the second lens element) 32 (L3) of the second lens group G2 concave to the object side and formed with a concave object side surface 32a and an aspheric image side surface 32b. The first and second lens elements 31 (L1) and 32 (L3) are designed and configured to satisfy the following optical conditions:

$$|f1| > f2 \quad (I)$$

$$R1 > R2 \quad (II)$$

where f1 is the focal length of the first lens element 31, f2 is the focal length of the second lens element 32, R1 is the radius of curvature of the object side surface of the first lens element 31, R2 is the radius of curvature of the image side surface of the first lens element 32.

These conditions (I) and (II) are necessary for the taking lens 30 to provide restrained aggravation of spherical aberration and high brightness on an image plane The aspheric surfaces of the first and second lens elements 31 and 32 may be defined by the following equation:

$$Z = Ch^2/[1+\sqrt{1-(1+K)C^2h^2}] + X_1 h^4 + X_2 h^6 + X_3 h^8 + X_4 h^{10}$$

Where

Z is the surface sag at semi-aperture distance h from the axis of lens,

C is the curvature of a lens surface at the optical axis equal to the reciprocal of the radius at the optical axis, K is a conic constant, $X_1$, $X_2$, $X_3$ and $X_4$ are aspheric constants.

The following examples shown in FIGS. 3, 6, 9, 12, 15 and 18 are described in Tables I–VI, respectively, are exemplary of taking lenses embodying the invention. The taking lenses 30 are configured meniscus and have aspheric surfaces defined by the foregoing aspheric equation. In the tables, the surface radius denoted by S followed by the surface number is the radius at the optical axis. Positive surface radii are struck from the. right of the lens surface on the optical axis, and negative surface radii are struck from the left of the lens surface on the optical axis. N is the index of refraction and V is the dispersion measured by the Abbe number. The axial distance is the progressive axial air space or the axial thickness between adjacent surfaces. f, $F_{no}$ and ω are the overall focal length, the F-number and the semi-field angle of the taking lens, respectively. Since the image surface of the filmstrip 16 in the film path 22 is concave in the lengthwise direction in which the filmstrip 16 moves and, strictly speaking, not spherical, the radius of curvature of the filmstrip 16 along a diagonal of the exposure aperture is taken as the radius of curvature of the image plane (Lp).

Figure 3:
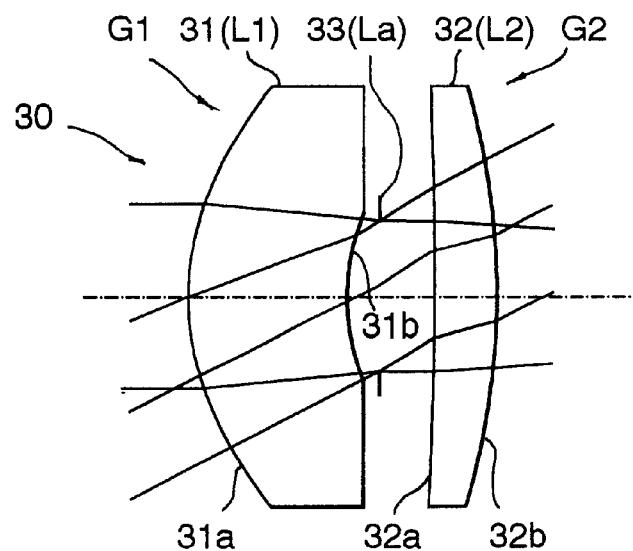
FIG. 3 is a side elevation of a taking lens of a first example.

A taking lens 30 of Example I is shown in FIG. 3 and described substantially in Table I.

TABLE I

| | Surface Radius (mm) | Axial Distance Between Surfaces (mm) | Semi-Effective Aperture (mm) | N | V |
|---|---|---|---|---|---|
| L1 | S1  3.499 | 1.50 | 2.82 | 1.492 | 57.5 |
|    | S2  3.377 | 0.55 | 1.45 | | |
| La | ∞ | 0.44 | 1.21 | | |
| L3 | S3  −71.981 | 0.81 | 1.7 | 1.492 | 57.5 |
|    | S4  −12.613 | 19.76 | 1.26 | | |
| Lp | −145.700 | | | | |

| Aspheric Surface: S2 and S4 Aspheric Coefficients: | |
|---|---|
| S2 | S3 |
| $X_1$  −1.5680 × 10⁻³ | −1.2405 × 10⁻³ |
| $X_2$  6.0603 × 10⁻³ | −2.2039 × 10⁻⁴ |
| $X_3$  −3.3361 × 10⁻³ | 3.9334 × 10⁻⁵ |
| $X_4$  6.9803 × 10⁻⁴ | −1.1036 × 10⁻⁵ |

| Conic Constant: | |
|---|---|
| K = −0.0086 | −3.3972 |

| Dimensions: | | | | |
|---|---|---|---|---|
| f(mm) | f1(mm) | f2(mm) | ω(°) | Fno |
| 23.58 | 90.78 | 25.34 | 34.42 | 8.0 |

As apparent from Table I, the taking lens 30 of Example I satisfies the conditions (I) and (II).

Figure 4:
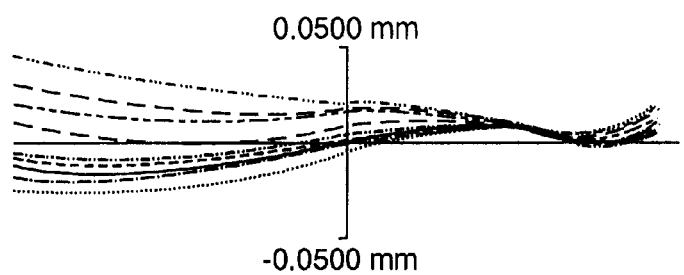
FIG. 4 is a graphical diagram showing lateral aberrations of the taking lens of the first example at a 70% relative field height.
Figure 5C:
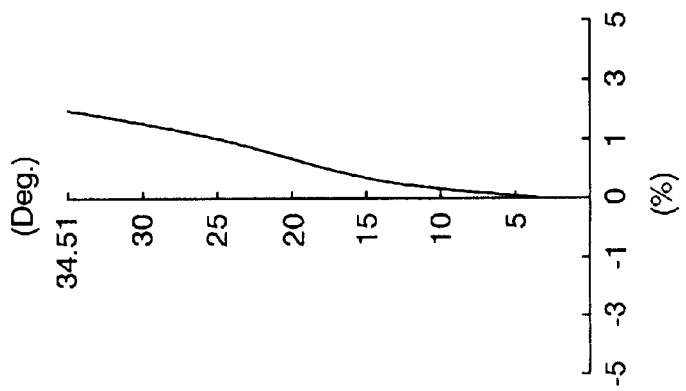
FIG. 5C is a graphical diagram showing distortion of the taking lens of the first example.
Figure 5B:
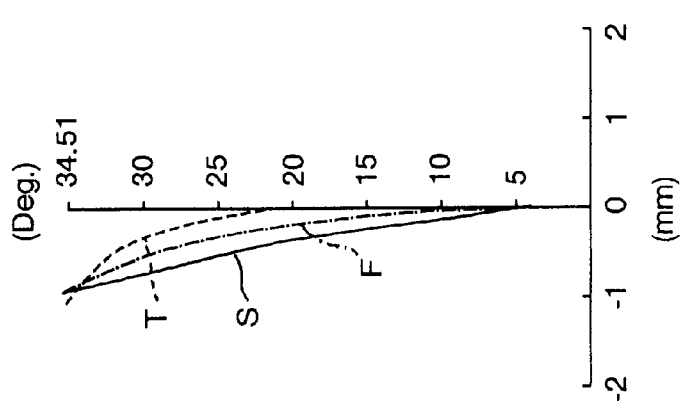
FIG. 5B is a graphical diagram showing field curvatures of the taking lens of the first example in sagittal (S) and tangential (T) planes.
Figure 5A:
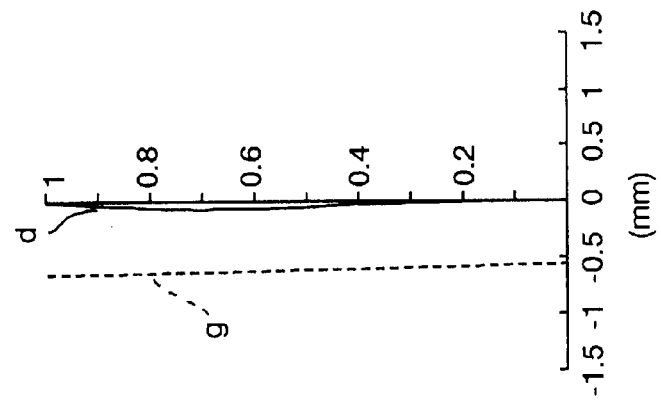
FIG. 5A is a graphical diagram showing spherical aberrations of the taking lens of the first example for a d-line of a wavelength of 587.6 nm and a g-line of a wavelength of 587.6 nm.

FIG. 4 and 5A through 5C show aberration characteristics of the taking lens 30 shown in FIG. 3. Specifically, FIG. 4 shows lateral aberrations at a 70% relative field height. FIGS. 5A, 5B and 5C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 5B is the curvature of the spherical image surface along a diagonal of the exposure aperture.

Figure 6:
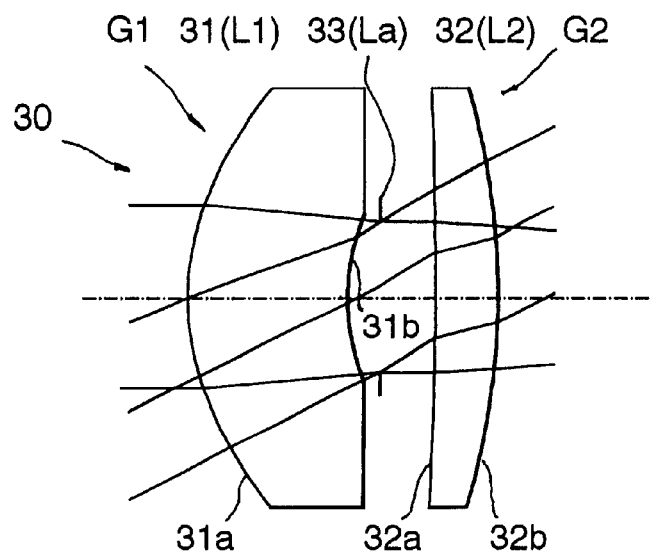
FIG. 6 is a side elevation of a taking lens of a second example.

A taking lens 30 of Example II is shown in FIG. 6 and described substantially in Table II.

TABLE II

|   | Surface | Surface Radius (mm) | Axial Distance Between Surfaces (mm) | Semi-Effective Aperture (mm) | N | V |
|---|---|---|---|---|---|---|
| L1 | S1 | 4.469 | 2.25 | 2.62 | 1.492 | 57.5 |
|   | S2 | 3.957 | 0.53 | 1.43 |   |   |
| La |   | ∞ | 0.59 | 1.23 |   |   |
| L3 | S3 | −17.302 | 0.90 | 1.48 | 1.492 | 57.5 |
|   | S4 | −6.921 | 19.74 | 1.82 |   |   |
| Lp |   | −145.700 |   |   |   |   |

Aspheric Surface: S2 and S4
Aspheric Coefficients:

|   | S2 | S3 |
|---|---|---|
| $X_1$ | $1.6258 \times 10^{-3}$ | $-1.0236 \times 10^{-3}$ |
| $X_2$ | $1.5972 \times 10^{-3}$ | $-8.1246 \times 10^{-4}$ |
| $X_3$ | $-7.4037 \times 10^{-4}$ | $2.1425 \times 10^{-5}$ |
| $X_4$ | $1.9322 \times 10^{-4}$ | $-2.9384 \times 10^{-5}$ |

Conic Constant:

| K = | 0.0000 | 0.0000 |
|---|---|---|

Dimension:

| f(mm) | f1(mm) | f2(mm) | ω(°) | Fno |
|---|---|---|---|---|
| 23.58 | 156.09 | 22.79 | 34.53 | 8.0 |

As apparent from Table II, the taking lens 30 of Example II satisfies the conditions (I) and (II).

Figure 7:
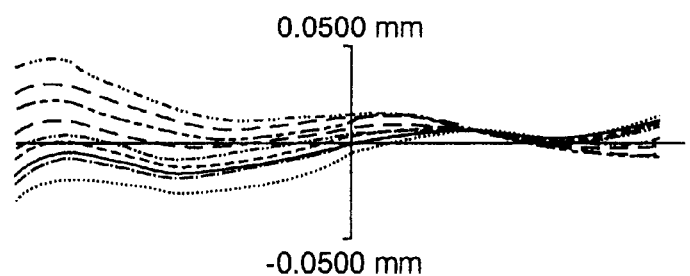
FIG. 7 is a graphical diagram showing lateral aberrations of the taking lens of the second example at a 70% relative field height.
Figure 8C:
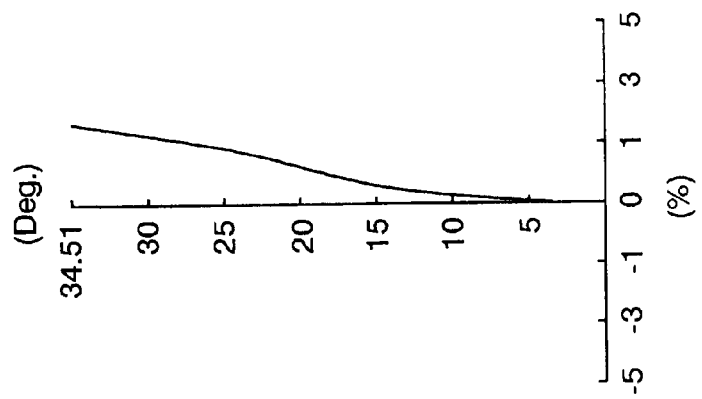
FIG. 8C is a graphical diagram showing distortion of the taking lens of the second
Figure 8B:
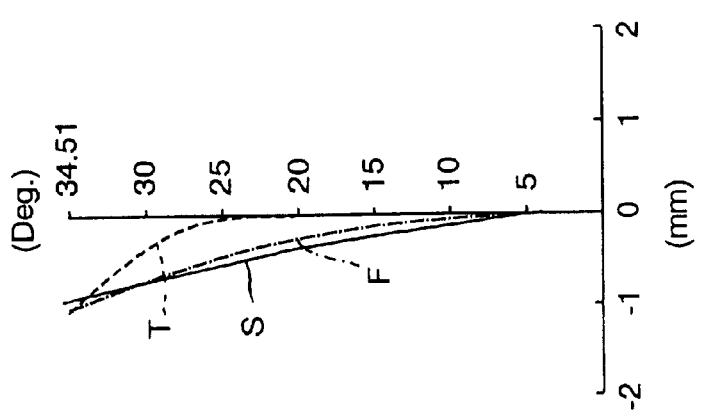
FIG. 8B is a graphical diagram showing field curvatures of the taking lens of the second example in sagittal (S) and tangential (T) planes.
Figure 8A:
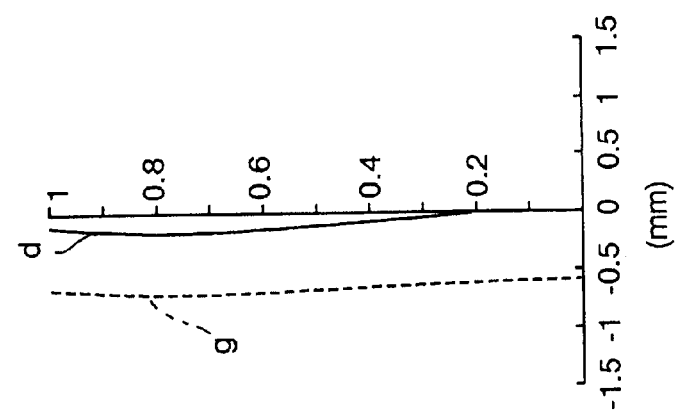
FIG. 8A is a graphical diagram showing spherical aberrations of the taking lens of the second example for a d-line of a wavelength of 587.6 nm and a g-line of a wavelength of 587.6 nm.

FIGS. 7 and 8A through 8C show aberration characteristics of the taking lens 30 shown in FIG. 6. Specifically, FIG. 7 shows lateral aberrations at a 70% relative field height. FIGS. 8A, 8B and 8C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 8B is the curvature of the spherical image surface along a diagonal of the exposure aperture.

Figure 9:
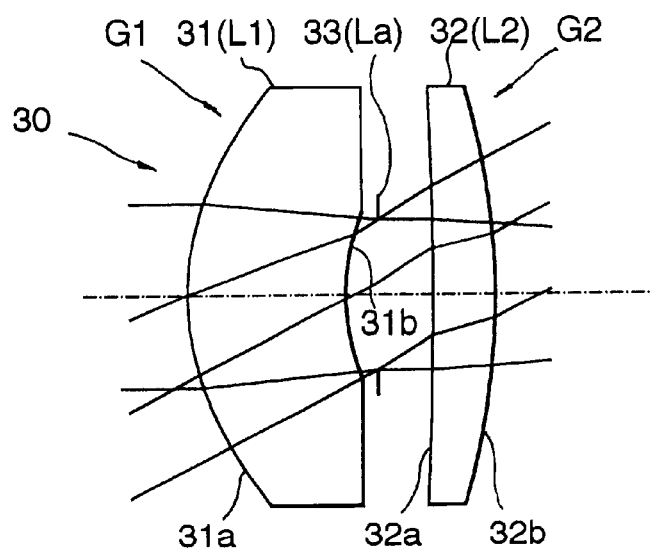
FIG. 9 is a side elevation of a taking lens of a third example.

A taking lens 30 of Example III is shown in FIG. 9 and described substantially in Table III.

TABLE III

|   | Surface | Surface Radius (mm) | Axial Distance Between Surfaces (mm) | Semi-Effective Aperture (mm) | N | V |
|---|---|---|---|---|---|---|
| L1 | S1 | 4.421 | 2.21 | 2.60 | 1.492 | 57.5 |
|   | S2 | 3.895 | 0.54 | 1.44 |   |   |
| La |   | ∞ | 0.54 | 1.23 |   |   |
| L3 | S3 | −16.651 | 0.90 | 1.46 | 1.492 | 57.5 |
|   | S4 | −6.766 | 19.81 | 1.78 |   |   |
| Lp |   | −145.700 |   |   |   |   |

Aspheric Surface: S2 and S4
Aspheric Coefficients:

|   | S2 | S3 |
|---|---|---|
| $X_1$ | $1.4744 \times 10^{-3}$ | $-9.6301 \times 10^{-4}$ |
| $X_2$ | $1.9603 \times 10^{-3}$ | $-1.0311 \times 10^{-3}$ |

TABLE III-continued

|   | S2 | S3 |
|---|---|---|
| $X_3$ | $-9.1130 \times 10^{-4}$ | $2.9353 \times 10^{-4}$ |
| $X_4$ | $2.3085 \times 10^{-4}$ | $-4.1019 \times 10^{-5}$ |

Conic Constant:

| K = | 0.0000 | 0.0000 |
|---|---|---|

Dimension:

| f(mm) | f1(mm) | f2(mm) | ω(°) | Fno |
|---|---|---|---|---|
| 23.58 | 172.16 | 22.49 | 34.57 | 8.0 |

As apparent from Table III, the taking lens 30 of Example III satisfies the conditions (I) and (II).

Figure 10:
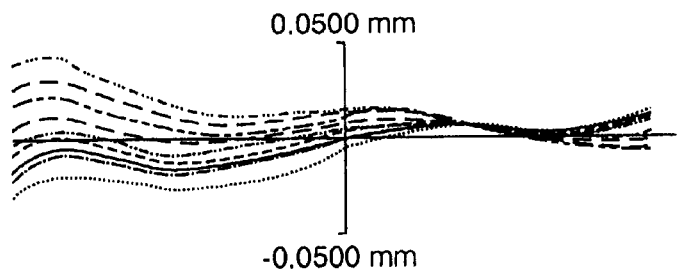
FIG. 10 is a graphical diagram showing lateral aberrations of the taking lens of the third example at a 70% relative field height.
Figure 11C:
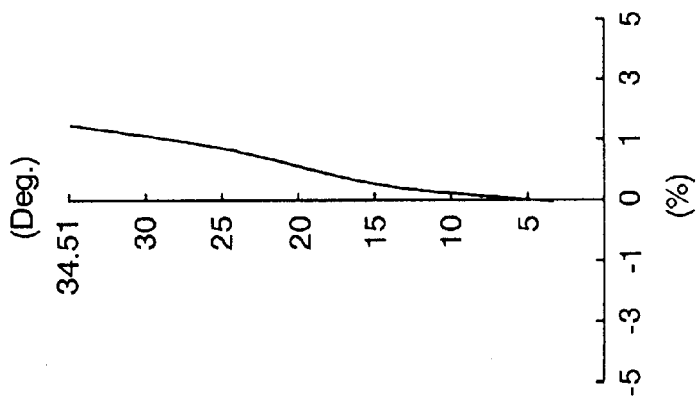
FIG. 11C is a graphical diagram showing distortion of the taking lens of the third example.
Figure 11B:
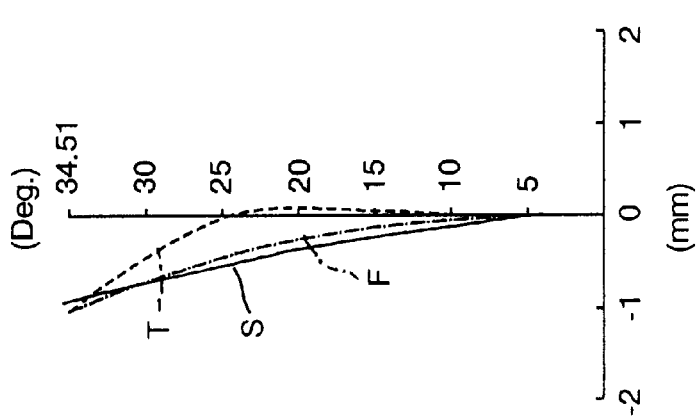
FIG. 11B is a graphical diagram showing field curvatures of the taking lens of the third example in sagittal (S) and tangential (T) planes.
Figure 11A:
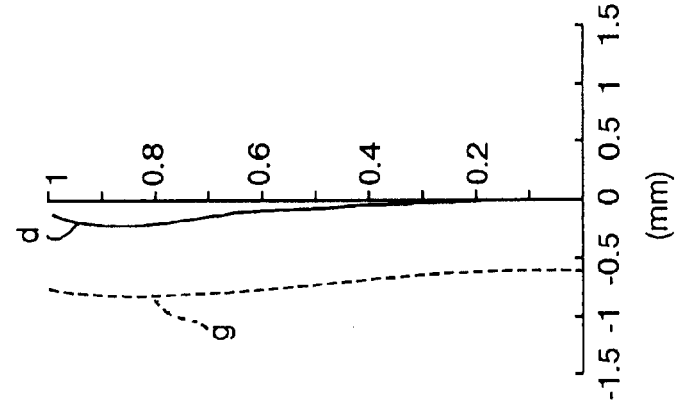
FIG. 11A is a graphical diagram showing spherical aberrations of the taking lens of the third example for a d-line of a wavelength of 587.6 nm and a g-line of a wavelength of 587.6 nm.

FIGS. 10 and 11A through 11C show aberration characteristics of the taking lens 30 shown in FIG. 9. Specifically, FIG. 10 shows lateral aberrations at a 70% relative field height. FIGS. 11A, 11B and 11C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 11B is the curvature of the spherical image surface along a diagonal of the exposure aperture.

Figure 12:
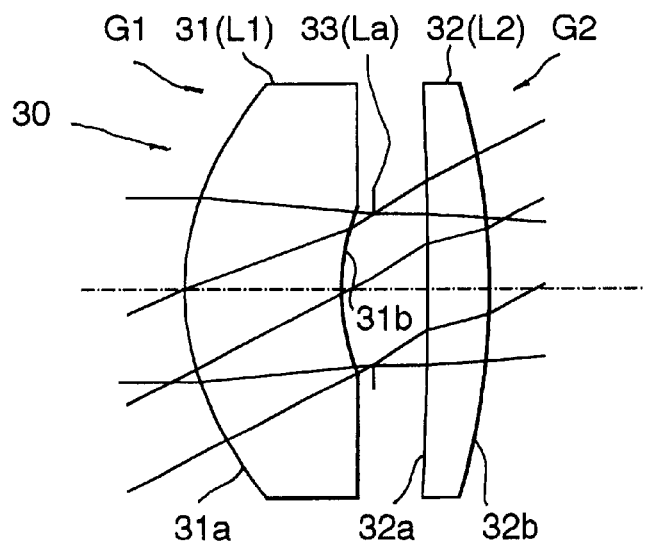
FIG. 12 is a side elevation of a taking lens of a fourth example.

A taking lens 30 of Example IV is shown in FIG. 12 and described substantially in Table IV.

TABLE IV

|   | Surface | Surface Radius (mm) | Axial Distance Between Surfaces (mm) | Semi-Effective Aperture (mm) | N | V |
|---|---|---|---|---|---|---|
| L1 | S1 | 4.693 | 2.63 | 2.67 | 1.492 | 57.5 |
|   | S2 | 4.246 | 0.46 | 1.30 |   |   |
| La |   | ∞ | 0.65 | 1.20 |   |   |
| L3 | S3 | −21.274 | 0.93 | 1.56 | 1.492 | 57.5 |
|   | S4 | −7.860 | 19.08 | 1.98 |   |   |
| Lp |   | −145.700 |   |   |   |   |

Aspheric Surface: S2 and S4
Aspheric Coefficients:

|   | S2 | S3 |
|---|---|---|
| $X_1$ | $1.1653 \times 10^{-3}$ | $-1.3058 \times 10^{-3}$ |
| $X_2$ | $1.5183 \times 10^{-3}$ | $-1.0506 \times 10^{-4}$ |
| $X_3$ | $-5.8753 \times 10^{-4}$ | $-3.6916 \times 10^{-5}$ |
| $X_4$ | $1.2002 \times 10^{-4}$ | $3.6440 \times 10^{-6}$ |

Conic Constant:

| K = | 0.0000 | 0.5518 |
|---|---|---|

Dimension:

| f(mm) | f1(mm) | f2(mm) | ω(°) | Fno |
|---|---|---|---|---|
| 23.58 | 96.56 | 24.77 | 34.3 | 8.0 |

As apparent from Table IV, the taking lens 30 of Example IV satisfies the conditions (I) and (II).

Figure 13:
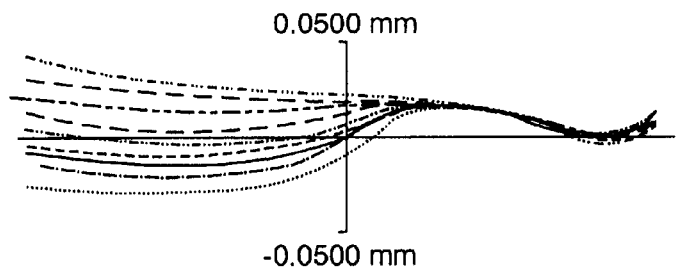
FIG. 13 is a graphical diagram showing lateral aberrations of the taking lens of the fourth example at a 70% relative field height.
Figure 14A:
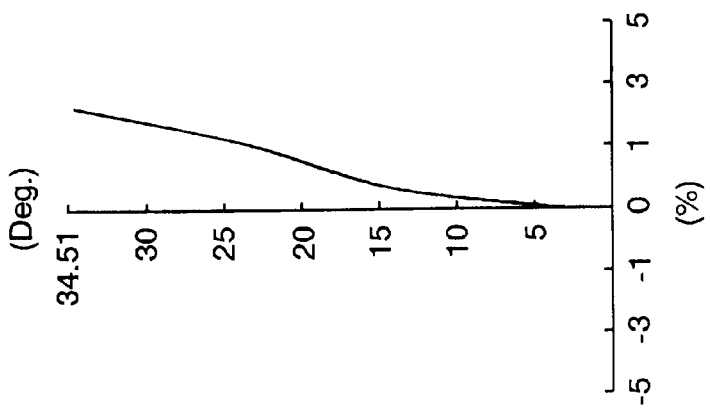
FIG. 14A is a graphical diagram showing spherical aberrations of the taking lens of the fourth example for a d-line of a wavelength of 587.6 nm and a g-line of a wavelength of 587.6 nm.
Figure 14B:
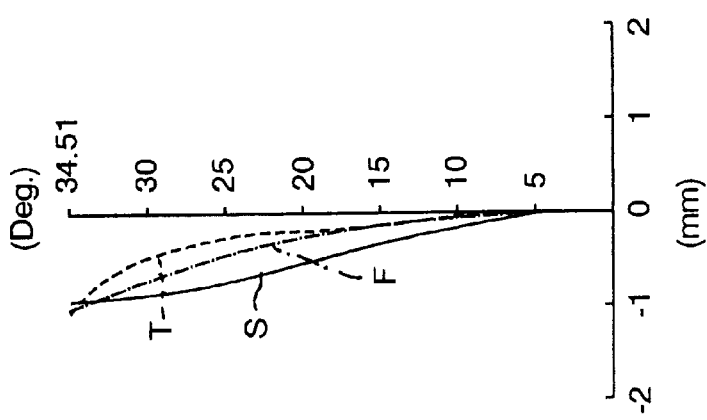
FIG. 14B is a graphical diagram showing field curvatures of the taking lens of the fourth example in sagittal (S) and tangential (T) planes.
Figure 14C:
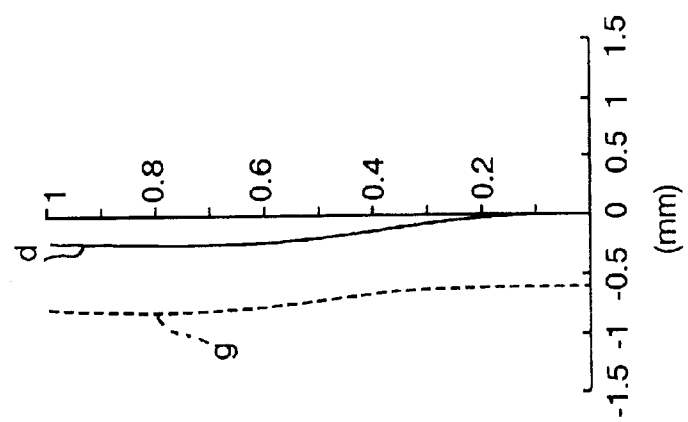
FIG. 14C is a graphical diagram showing distortion of the taking lens of the fourth example.

FIGS. 13 and 14A through 14C show aberration characteristics of the taking lens 30 shown in FIG. 12. Specifically, FIG. 13 shows lateral aberrations at a 70% relative field height. FIGS. 14A, 14B and 14C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 14B is the curvature of the spherical image surface along a diagonal of the exposure aperture.

A taking lens 30 of Example V is shown in FIG. 12 and described substantially in Table V.

TABLE V

| | Surface Radius (mm) | Axial Distance Between Surfaces (mm) | Semi-Effective Aperture (mm) | N | V |
|---|---|---|---|---|---|
| L1 | S1 4.887 | 2.92 | 2.94 | 1.492 | 57.5 |
| | S2 4.289 | 0.50 | 1.40 | | |
| La | ∞ | 0.51 | 1.18 | | |
| L3 | S3 −19.701 | 1.30 | 1.56 | 1.492 | 57.5 |
| | S4 −7.342 | 1.72 | 1.98 | | |
| Lp | −145.700 | | | | |

Aspheric Surface: S2 and S4
Aspheric Coefficients:

| | S2 | S3 |
|---|---|---|
| $X_1$ | $-6.7358 \times 10^{-5}$ | $-1.8646 \times 10^{-3}$ |
| $X_2$ | $4.6896 \times 10^{-3}$ | $-1.3987 \times 10^{-4}$ |
| $X_3$ | $-2.6625 \times 10^{-3}$ | $-7.6844 \times 10^{-6}$ |
| $X_4$ | $6.0308 \times 10^{-4}$ | $-2.1119 \times 10^{-6}$ |

Conic Constant:

| K = | 0.0000 | 0.7502 |
|---|---|---|

Dimension:

| f(mm) | f1(mm) | f2(mm) | ω(°) | Fno |
|---|---|---|---|---|
| 23.58 | 116.7 | 23.24 | 34.31 | 8.0 |

As apparent from Table V, the taking lens 30 of Example V satisfies the conditions (I) and (II).

Figure 15:
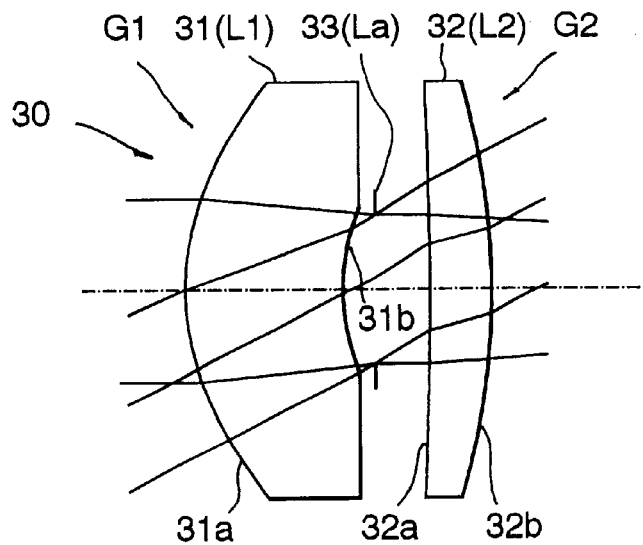
FIG. 15 is a side elevation of a taking lens of a fifth example.
Figure 16:
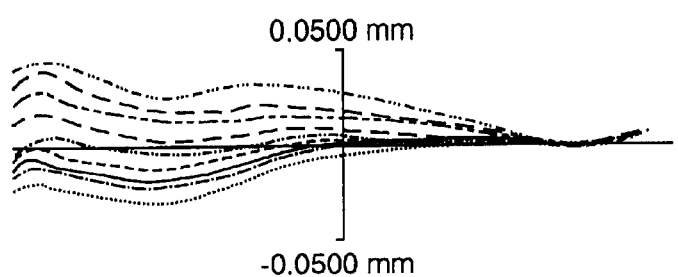
FIG. 16 is a graphical diagram showing lateral aberrations of the taking lens of the fifth example at a 70% relative field height.
Figure 17A:
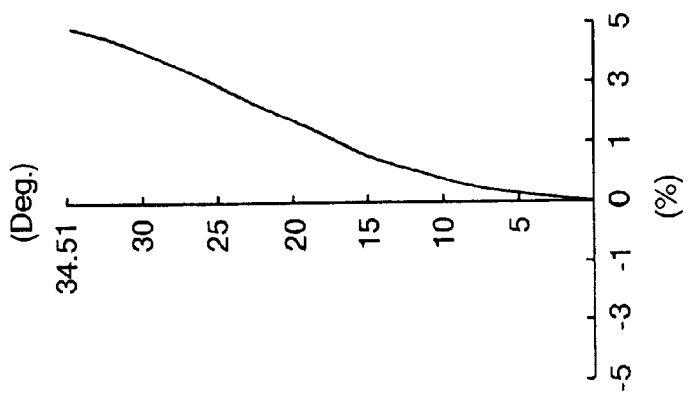
FIG. 17A is a graphical diagram showing spherical aberrations of the taking lens of the fifth example for a d-line of a wavelength of 587.6 nm and a g-line of a wavelength of 587.6 nm.
Figure 17B:
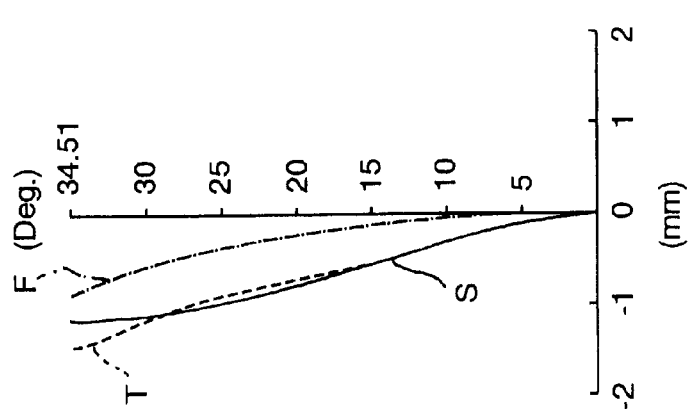
FIG. 17B is a graphical diagram showing field curvatures of the taking lens of the fifth example in sagittal (S) and tangential (T) planes.
Figure 17C:
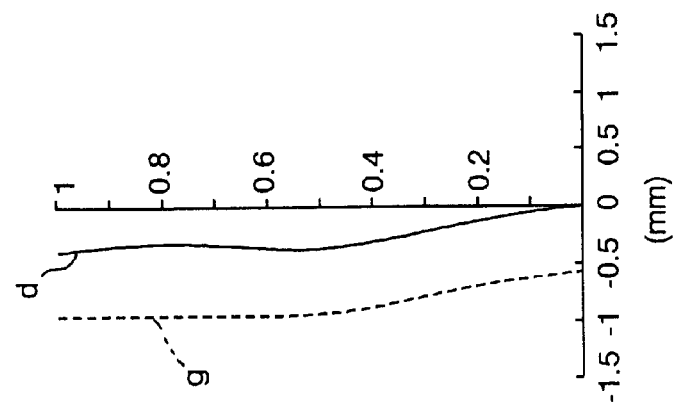
FIG. 17C is a graphical diagram showing distortion of the taking lens of the fifth example.

FIGS. 16 and 17A through 17C show aberration characteristics of the taking lens 30 shown in FIG. 15. Specifically, FIG. 16 shows lateral aberrations at a 70% relative field height. FIGS. 17A, 17B and 17C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 17B is the curvature of the spherical image surface along a diagonal of the exposure aperture.

A taking lens 30 of Example VI is shown in FIG. 12 and described substantially in Table VI.

TABLE VI

| | Surface Radius (mm) | Axial Distance Between Surfaces (mm) | Semi-Effective Aperture (mm) | N | V |
|---|---|---|---|---|---|
| L1 | S1 3.499 | 1.50 | 2.21 | 1.492 | 57.5 |
| | S2 3.377 | 0.55 | 1.44 | | |
| La | ∞ | 0.44 | 1.26 | | |
| L3 | S3 −71.981 | 0.81 | 1.34 | 1.492 | 57.5 |
| | S4 −12.613 | 19.76 | 1.65 | | |
| Lp | −145.700 | | | | |

Aspheric Surface: S2 and S4
Aspheric Coefficients:

| | S2 | S3 |
|---|---|---|
| $X_1$ | $-1.5680 \times 10^{-3}$ | $-1.2405 \times 10^{-3}$ |
| $X_2$ | $6.0603 \times 10^{-3}$ | $-2.2039 \times 10^{-4}$ |
| $X_3$ | $-3.3361 \times 10^{-3}$ | $3.9334 \times 10^{-5}$ |
| $X_4$ | $6.9803 \times 10^{-4}$ | $-1.1036 \times 10^{-5}$ |

Conic Constant:

| K = | 0.0086 | 3.3972 |
|---|---|---|

Dimension:

| f(mm) | f1(mm) | f2(mm) | ω(°) | Fno |
|---|---|---|---|---|
| 23.58 | 64.58 | 30.95 | 34.38 | 8.0 |

As apparent from Table VI, the taking lens 30 of Example VI satisfies the conditions (I) and (II).

Figure 18:
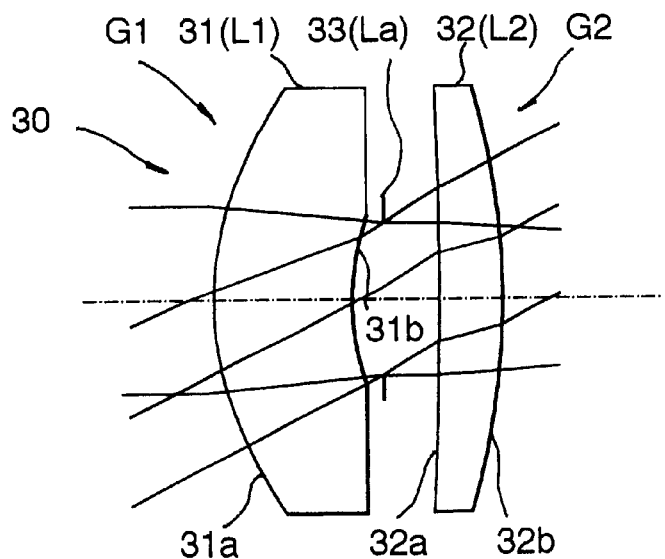
FIG. 18 is a side elevation of a taking lens of a sixth example.
Figure 19:
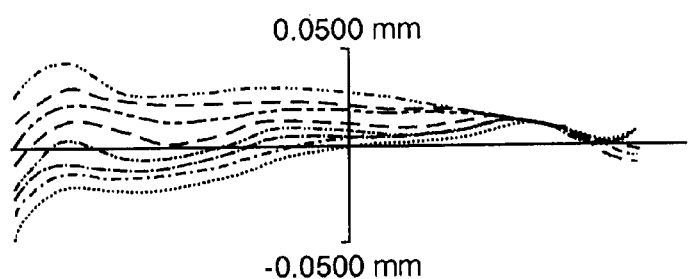
FIG. 19 is a graphical diagram showing lateral aberrations of the taking lens of the sixth example at a 70% relative field height.
Figure 20A:
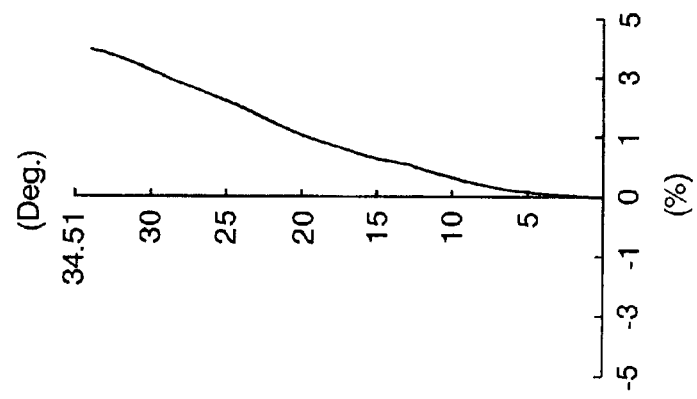
FIG. 20A is a graphical diagram showing spherical aberrations of the taking lens of the sixth example for a d-line of a wavelength of 587.6 nm and a g-line of a wavelength of 587.6 nm.
Figure 20B:
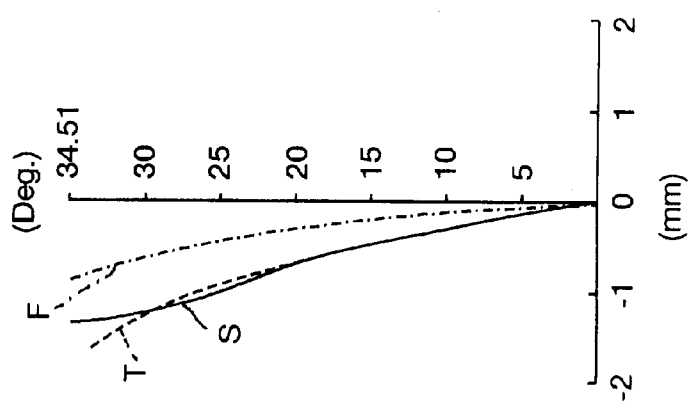
FIG. 20B is a graphical diagram showing field curvatures of the taking lens of the sixth example in sagittal (S) and tangential (T) planes.
Figure 20C:
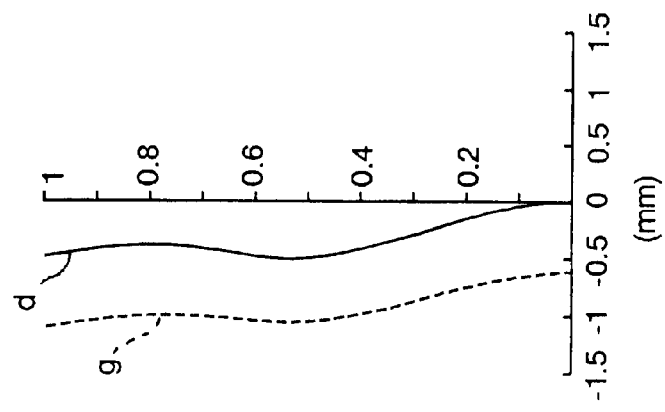
FIG. 20C is a graphical diagram showing distortion of the taking lens of the sixth example.

FIGS. 19 and 20A through 20C show aberration characteristics of the taking lens 30 shown in FIG. 18. Specifically, FIG. 19 shows lateral aberrations at a 70% relative field height. FIGS. 20A, 20B and 20C show spherical aberrations for a d-line of a wavelength of 587.6 nm and a g-line of a wavelength of 587.6 nm, field curvatures in sagittal (S) and tangential (T) planes, and distortion, respectively. The curve denoted by a label F in FIG. 20B is the curvature of the spherical image surface along a diagonal of the exposure aperture.

It is to be noted that, although the taking lenses of the respective examples are described as applied to the exposure frame format of 16.7×30.2 mm, they may be applied to different exposure frame formats as long as the ratio of the focal length of the taking lens relative to the exposure frame format is approximately same. In this case, the taking lens is configured by proportionally changing the parameters placed on Tables I–VI according to exposure frame formats. The taking lens of the present invention is not limited to applications to lens-fitted film units and may be applied to every type of fixed-focus camera.

As described above, the taking lens of the present invention provides well balanced distribution of various aberrations and high brightness on the image plane while ensuring a semi-field angle of an order of 34° by providing the first lens element at the object side with and the second lens element at either one of the object and image sides with aspheric surfaces and configuring the first and second lens elements so as to satisfy the conditions (I) and (II). Moreover, since the first lens element at the object side surface is configured non-aspheric, aggravation of field curvature is significantly reduced in the sagittal plane. In consequence, field curvature of the taking lens is alleviated with an effect of alleviation of chromatic difference of magnification due to curvature of the image plane even when the image plane is less curved.

It is to be understood that although the present invention has been described in detail with respect to preferred embodiments, various other embodiments and variants are possible which are within the spirit and scope of the invention, and such are intended to be covered by the following claims.

What is claimed is:

1. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z = Ch^2/[1+\sqrt{1-(1+K)Ch^2}] + X_1 h^4 + X_2 h^6 + X_3 h^8 + X_4 h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively.

2. A taking lens as defined in claim 1, wherein each of said positive power first and second meniscus lens elements is made of plastic.

3. A taking lens for a fixed-focus photographic device having an image plane which is concave in a direction of film movement to the object side and on which said taking lens forms an image of an object, said taking lens comprising, in order from the object side, a first lens group which consists of a positive power first meniscus lens element convex to the object side, a fixed aperture, and a second lens group which consists of a positive power second meniscus lens element concave to the object side, wherein said positive power first meniscus lens element at an image side surface and said positive power second meniscus lens element at one of image and object side surfaces are defined by the following relationship:

$$Z=Ch^2/[1+\sqrt{1-(1+K)Ch^2}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively.

4. A taking lens as defined in claim 3, wherein each of said positive power first and second meniscus lens elements is made of plastic.

5. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z=Ch^2/[1+\sqrt{1-(1+K)C^{2h^2}}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|  | Surface | Radius (mm) | Axial Distance Between Surfaces (mm) | Semi-Effective Aperture (mm) | N | V |
|---|---|---|---|---|---|---|
| L1 | S1 | 3.499 | 1.50 | 2.82 | 1.492 | 57.5 |
|  | S2 | 3.377 | 0.55 | 1.45 |  |  |
| La |  | ∞ | 0.44 | 1.21 |  |  |
| L3 | S3 | −71.981 | 0.81 | 1.7 | 1.492 | 57.5 |
|  | S4 | −12.613 | 19.76 | 1.26 |  |  |

Aspheric Surface: S2 and S4
Aspheric Coefficients:

|  | S2 | S3 |
|---|---|---|
| $X_1$ | $-1.5680 \times 10^{-3}$ | $-1.2405 \times 10^{-3}$ |
| $X_2$ | $6.0603 \times 10^{-3}$ | $-2.2039 \times 10^{-4}$ |
| $X_3$ | $-3.3361 \times 10^{-3}$ | $3.9334 \times 10^{-5}$ |
| $X_4$ | $6.9803 \times 10^{-4}$ | $-1.1036 \times 10^{-5}$ |

Conic Constant:

| K = | −0.0086 | −3.3972 |
|---|---|---| where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

6. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z=Ch^2/[1+\sqrt{(1-(1+K)C^2h^2)}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|  |  | Surface Radius (mm) | Axial Distance Between Surfaces (mm) | Semi-Effective Aperture (mm) | N | V |
|---|---|---|---|---|---|---|
| L1 | S1 | 4.469 | 2.25 | 2.62 | 1.492 | 57.5 |
|  | S2 | 3.957 | 0.53 | 1.43 |  |  |
| La |  | ∞ |  0.59 | 1.23 |  |  |
| L3 | S3 | −17.302 | 0.90 | 1.48 | 1.492 | 57.5 |
|  | S4 | −6.921 | 19.74 | 1.82 |  |  |

| Aspheric Surface: S2 and S4 Aspheric Coefficients: | |
|---|---|
| S2 | S3 |
| $X_1$ = 1.6258 × 10⁻³ | −1.0236 × 10⁻³ |
| $X_2$ = 1.5972 × 10⁻³ | −8.1246 × 10⁻⁴ |
| $X_3$ = −7.4037 × 10⁻⁴ | 2.1425 × 10⁻⁵ |
| $X_4$ = 1.9322 × 10⁻⁴ | −2.9384 × 10⁻⁵ |

| Conic Constant: | | |
|---|---|---|
| K = | 0.0000 | 0.0000 | where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

7. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z=Ch^2/[1+\sqrt{(1-(1+K)C^2h^2)}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|  |  | Surface Radius (mm) | Axial Distance Between Surfaces (mm) | Semi-Effective Aperture (mm) | N | V |
|---|---|---|---|---|---|---|
| L1 | S1 | 4.421 | 2.21 | 2.60 | 1.492 | 57.5 |
|  | S2 | 3.895 | 0.54 | 1.44 |  |  |
| La |  | ∞ | 0.54 | 1.23 |  |  |
| L3 | S3 | −16.651 | 0.90 | 1.46 | 1.492 | 57.5 |
|  | S4 | −6.766 | 19.81 | 1.78 |  |  |

| Aspheric Surface: S2 and S4 Aspheric Coefficients: | |
|---|---|
| S2 | S3 |
| $X_1$ = 1.4744 × 10⁻³ | −9.6301 × 10⁻⁴ |
| $X_2$ = 1.9603 × 10⁻³ | −1.0311 × 10⁻³ |
| $X_3$ = −9.1130 × 10⁻⁴ | 2.9353 × 10⁻⁴ |
| $X_4$ = 2.3085 × 10⁻⁴ | −4.1019 × 10⁻⁵ |

| Conic Constant: | | |
|---|---|---|
| K = | 0.0000 | 0.0000 | where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

8. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z=Ch^2/[1+\sqrt{(1-(1+K)C^2h^2)}]+X_1h^4+X_2h^6+X_3h^8+X_4h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

|f1|>f2

R1>R2 where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|    | Surface | Radius (mm) | Axial Distance Between Surfaces (mm) | Semi-Effective Aperture (mm) | N | V |
|----|---------|-------------|--------------------------------------|------------------------------|-------|------|
| L1 | S1      | 4.693       | 2.63                                 | 2.67                         | 1.492 | 57.5 |
|    | S2      | 4.246       | 0.46                                 | 1.30                         |       |      |
| La |         | ∞           | 0.65                                 | 1.20                         |       |      |
| L3 | S3      | −21.274     | 0.93                                 | 1.56                         | 1.492 | 57.5 |
|    | S4      | −7.860      | 19.08                                | 1.98                         |       |      |

Aspheric Surface: S2 and S4
Aspheric Coefficients:

|       | S2                     | S3                      |
|-------|------------------------|-------------------------|
| $X_1$ | $1.1653 \times 10^{-3}$ | $-1.3058 \times 10^{-3}$ |
| $X_2$ | $1.5183 \times 10^{-3}$ | $-1.0506 \times 10^{-4}$ |
| $X_3$ | $-5.8753 \times 10^{-4}$ | $-3.6916 \times 10^{-5}$ |
| $X_4$ | $1.2002 \times 10^{-4}$ | $3.6440 \times 10^{-6}$  |

Conic Constant:

K =   0.0000   0.5518 where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

9. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z = Ch^2 / [1 + \sqrt{(1-(1+K)C^2h^2)}] + X_1 h^4 + X_2 h^6 + X_3 h^8 + X_4 h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

|f1|>f2

R1>R2 where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|    | Surface | Radius (mm) | Axial Distance Between Surfaces (mm) | Semi-Effective Aperture (mm) | N | V |
|----|---------|-------------|--------------------------------------|------------------------------|-------|------|
| L1 | S1      | 4.887       | 2.92                                 | 2.94                         | 1.492 | 57.5 |
|    | S2      | 4.289       | 0.50                                 | 1.40                         |       |      |
| La |         | ∞           | 0.51                                 | 1.18                         |       |      |
| L3 | S3      | −19.701     | 1.30                                 | 1.56                         | 1.492 | 57.5 |
|    | S4      | −7.342      | 1.72                                 | 1.98                         |       |      |

Aspheric Surface: S2 and S4
Aspheric Coefficients:

|       | S2                      | S3                       |
|-------|-------------------------|--------------------------|
| $X_1$ | $-6.7358 \times 10^{-5}$ | $-1.8646 \times 10^{-3}$ |
| $X_2$ | $4.6896 \times 10^{-3}$  | $-1.3987 \times 10^{-4}$ |
| $X_3$ | $-2.6625 \times 10^{-3}$ | $-7.6844 \times 10^{-6}$ |
| $X_4$ | $6.0308 \times 10^{-4}$  | $-2.1119 \times 10^{-6}$ |

Conic Constant:

K =   0.0000   0.7502 where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

10. A taking lens for a photographic device comprising, in order from the object side, a first lens group which consists of a positive power first meniscus lens element convex to the object side, a fixed aperture and a second lens group which consists of a positive power second meniscus lens element concave to the object side, wherein said positive power first meniscus lens element at an image side surface and said positive power second meniscus lens element at one of image and object side surfaces are defined by the following relationship:

$$Z = Ch^2 / [1 + \sqrt{(1-(1+K)C^2h^2)}] + X_1 h^4 + X_2 h^6 + X_3 h^8 + X_4 h^{10}$$

where Z is the surface sag at semi-aperture distance h from the axis of the lens, C is the curvature of a lens surface at the optical axis equal to the reciprocal of the radius at the optical axis, K is a conic constant, and $X_1$, $X_2$, $X_3$ and $X_4$ are aspheric constants, and wherein said positive power first and second meniscus lens elements satisfy the following conditions:

$|f1|>f2$ $R1>R2$ where f1 is the focal length of the positive power first meniscus lens element, f2 is the focal length of the positive power second meniscus lens element, R1 and R2 are the radii of curvature of the object side and image side surfaces of the positive power first meniscus lens element, respectively;

wherein said taking lens is described substantially as follows:

|  |  | Surface Radius (mm) | Axial Distance Between Surfaces (mm) | Semi-Effective Aperture (mm) | N | V |
|---|---|---|---|---|---|---|
| L1 | S1 | 3.499 | 1.50 | 2.21 | 1.492 | 57.5 |
|  | S2 | 3.377 | 0.55 | 1.44 |  |  |
| La |  | ∞ | 0.44 | 1.26 |  |  |
| L3 | S3 | −71.981 | 0.81 | 1.34 | 1.492 | 57.5 |
|  | S4 | −12.613 | 19.76 | 1.65 |  |  |

| Aspheric Surface: 2 and 4 Aspheric Coefficients: | |
|---|---|
| S2 | S3 |
| $X_1$  −1.5680 × 10$^{-3}$ | −1.2405 × 10$^{-3}$ |
| $X_2$  6.0603 × 10$^{-3}$ | −2.2039 × 10$^{-4}$ |
| $X_3$  −3.3361 × 10$^{-3}$ | 3.9334 × 10$^{-5}$ |
| $X_4$  6.9803 × 10$^{-4}$ | −1.1036 × 10$^{-5}$ |
| Conic Constant: | |
| K = 0.0086 | 3.3972 | where the surface radius denoted by S followed by the surface number is the radius at the optical axis, the surfaces where positive are on radii struck from the right and where negative are on radii struck from the left, N is the index of refraction, V is the dispersion measured by the Abbe number, and f, $F_{no}$ and ω are the overall focal length, the F-number and the semi-field angle of the taking lens, respectively.

\* \* \* \* \*